(12) United States Patent
Enscoe et al.

(10) Patent No.: US 8,473,607 B2
(45) Date of Patent: Jun. 25, 2013

(54) SYSTEM AND METHOD FOR SOFTWARE USAGE DISCOVERY

(75) Inventors: Christopher J. Enscoe, Earlville, NY (US); Gary H. Newman, Concord, MA (US)

(73) Assignee: Belarc, Inc., Maynard, MA (US)

( * ) Notice: Subject to any disclaimer, the term of this patent is extended or adjusted under 35 U.S.C. 154(b) by 744 days.

(21) Appl. No.: 12/553,022

(22) Filed: Sep. 2, 2009

(65) Prior Publication Data
US 2010/0057905 A1 Mar. 4, 2010

Related U.S. Application Data

(60) Provisional application No. 61/093,618, filed on Sep. 2, 2008.

(51) Int. Cl.
*G06F 15/173* (2006.01)
*G06F 15/16* (2006.01)

(52) U.S. Cl.
USPC ............ 709/224; 709/203; 709/217; 717/100

(58) Field of Classification Search
USPC .. 709/202–203, 217–219, 223–224; 717/100, 717/106, 120
See application file for complete search history.

(56) References Cited

U.S. PATENT DOCUMENTS

| | | | |
|---|---|---|---|
| 5,023,907 A * | 6/1991 | Johnson et al. | 710/200 |
| 5,499,340 A | 3/1996 | Barritz | |
| 5,579,222 A * | 11/1996 | Bains et al. | 717/167 |
| 5,678,044 A * | 10/1997 | Pastilha et al. | 1/1 |
| 6,128,016 A | 10/2000 | Coelho et al. | |
| 6,233,604 B1 * | 5/2001 | Van Horne et al. | 709/203 |
| 7,237,240 B1 * | 6/2007 | Chen et al. | 718/100 |
| 7,844,616 B2 * | 11/2010 | Jackson | 707/758 |
| 8,165,886 B1 * | 4/2012 | Gagnon et al. | 704/275 |
| 2001/0013024 A1 | 8/2001 | Takahashi et al. | |
| 2004/0236728 A1 | 11/2004 | Newman et al. | |

(Continued)

FOREIGN PATENT DOCUMENTS

| WO | WO 01/53948 A | 7/2001 |
|---|---|---|
| WO | WO 02/05184 A | 1/2002 |

OTHER PUBLICATIONS

International Search Report, mail date May 11, 2009 for International Application No. PCT/US2009/004983, filed by Belarc, Inc. on Feb. 9, 2009, 15 pages.

*Primary Examiner* — Bharat N Barot
(74) *Attorney, Agent, or Firm* — Cesari and McKenna, LLP

(57) ABSTRACT

A method of obtaining information about usage of application executable files and associated software program in a network of computers or on an individual computer is provided. The method involves collecting information about last use of software programs, and associated executable files, on a computer or a set of managed computers from various resources on the computers. The information that is collected includes file name, directory, date and time the executable was last started, a security identifier of the last user, the method of last use, whether the executable was found to be running at the time it was found, and whether the executable is registered to run as a service. From this information, a list is generated regarding software items, and the list is merged such that a given executable has a single software item on the list. Reports are produced detailing information about one or more software items on the list. The reports may be displayed in a graphic user interface designed for that purpose.

30 Claims, 14 Drawing Sheets

U.S. PATENT DOCUMENTS

2004/0260952 A1 12/2004 Newman et al.
2007/0245002 A1* 10/2007 Nguyen et al. ................ 709/223
2010/0095273 A1* 4/2010 Matthiesen ................... 717/120

* cited by examiner

| Data Collected by Software Usage Discovery Methods | |
|---|---|
| Name | Description |
| FileName* | Name of the executable (.exe) file. |
| Directory* | Directory where the file is located. |
| LastUseTime* | Date and time the executable was last started (in GMT). |
| LastUseUser | A string specifying the security identifier (SID) of the user who last started the executable. |
| LastUseMethod | An integer showing how LastUseTime and LastUseUser were determined. Possible values are:<br>0 = MethodNone<br>1 = MethodLastAccessed<br>2 = MethodUserAssist<br>3 = MethodPrefetch<br>4 = MethodAppRunning<br>5 = MethodAppStartup |
| IsRunning | A boolean showing if the executable was found running at the time of discovery. |
| IsService | A boolean showing if the executable is registered and run as a service. |

Important Header Data in the Windows Prefetch Files

| Byte Offset | Data Type | Data Description |
|---|---|---|
| 4 | DWORD (4 bytes) | Magic number 'ACCS' |
| 100 | DWORD (4 bytes) | Offset to start of module path list |
| 104 | DWORD (4 bytes) | Size of module path list (in bytes) |
| 120 | FILETIME (8 bytes) | Time of last application execution |
| 144 | DWORD (4 bytes) | Number of application executions |

Important Data in the Windows UserAssist Binary Values

| Byte Offset (Version 3) | Byte Offset (Version 5) | Data Type | Data Description |
|---|---|---|---|
| 4 | 4 | DWORD (4 bytes) | Number of application executions |
| 8 | 60 | FILETIME (8 bytes) | Time of last application execution |

FIG. 13

SYSTEM AND METHOD FOR SOFTWARE USAGE DISCOVERY

CROSS-REFERENCE TO RELATED APPLICATIONS

The present application claims the benefit of U.S. Provisional Patent Application Ser. No. 61/093,618, which was filed on Sep. 2, 2008, by Christopher J. Enscoe et. al., for a SOFTWARE USAGE DISCOVERY ADDED TO BELMANAGE and is hereby incorporated by reference.

BACKGROUND OF THE INVENTION

1. Field of the Invention

The invention relates generally to systems and methods of managing information about a plurality of computers and, more particularly, to systems and methods for discovering and reporting information about software usage on such computers.

2. Background Information

In a large scale network of a plurality of computers, such as for a multinational corporation or a government entity, it is a challenge to track the usage of the many software programs, and the executable files that make up such programs that are installed on each computer in the network. It is important to maintain accurate information about the usage of programs in order that, for example, an administrator can make informed decisions about the necessity of maintaining current licenses for the multitude of applicant executable files (sometimes referred to herein as simply "executables") The aggregate of a set of executable files make up software programs that are installed on the computers in the network. Also of interest to an administrator is the manner in which the executables are allocated within the network. More particularly, there may be many application executable files installed on such computers for which single or multiple user licenses are being paid and maintained, and in some cases, such executables are rarely, if ever, used or accessed.

Current versions of the Windows® operating system and other operating systems do not provide direct, reliable information about the usage of software on a computer and/or a network of computers. As yet, there is not a system or method for reliably and efficiently collecting and maintaining such information in a non-invasive way. Currently available products monitor application usage invasively, at run-time of the monitored application. Such products add overhead to the operation of each computer and can contribute to unreliability of the computer through the monitoring methods they use. In addition, those products can only provide usage information prospectively after they are installed on the computer.

Therefore, there remains a need for a system that tracks and maintains records of software usage, version, recency of use and the like for a computer system containing multiple computers, or for an individual computer.

SUMMARY OF THE INVENTION

These disadvantages of prior techniques are overcome by the present invention, which is a system and method for software usage discovery. The illustrative embodiment of the invention includes a network of client computers that are interconnected with a server over an intranet, or the Internet, or other communications link. The server and/or one or more of the client computers is coupled to one or more associated databases. It should also be understood that the present invention can be readily employed with an individual stand alone computer.

The software usage discovery system of the present invention runs on each client computer in the network and gathers usage data about application executable files from various storage locations on those client computers in the network, or on an individual computer. The software usage information is extracted from various files, registry keys and other storage locations that contain such information as is relevant to the usage of application executable files on the network, as well as the associated one or more of the databases.

A client computer is programmed to collect usage data and aggregate the data into "software items." Each software item as used herein, represents an application executable and stores it in a table with information about the executable or version thereof. Based upon the software items for a given executable file that the client computer discovers from its own disks or memory, the important data from each of the software items is included in a record that may be uploaded to the associated database and included in reports generated using the data in the database. The present invention is directed primarily to discovering usage information relating to executable files, however, the invention may be adapted to discovering access or usage of data files, if desired in a particular application of the invention.

More specifically, data about usage of application executable files from a number of sources, including data collected using a variety of different methods, as discussed herein, are incorporated into corresponding software items for several methods for each executable. The software items are then merged such that all of the relevant information about a particular executable is extracted from each software item to create a record of executables that are installed on that computer. Briefly, the merge process involves multiple queries that are applied to adjacent items on the list that refer to the same file path. If a duplication is found, important data from the duplicate item is transferred to the retained item and the duplicate is then discarded. The merged items for the executables may then be uploaded to the server and the server stores the items as records in an associated database. The server may then generate one or more reports from the records of certain or all of the computers in a suitable manner as requested by the administrator. The information in the reports may then be displayed in a graphic user interface (GUI) that allows a user to view and utilize the information.

BRIEF DESCRIPTION OF THE DRAWINGS

The invention description below refers to the accompanying drawings, of which:

FIG. 2 is a chart referred to herein as a software item which contains usage data that is collected for a particular executable application in accordance with an illustrative embodiment of the present invention;

FIG. 12 is a chart illustrating exemplary header data in a Windows® Prefetch File which can be advantageously employed in accordance with an illustrative embodiment of the present invention; and FIG. 13 is a chart illustrating exemplary header data in the new Windows 7 operating system regarding User Assist keys.

DETAILED DESCRIPTION OF AN ILLUSTRATIVE EMBODIMENT

Figure 1:
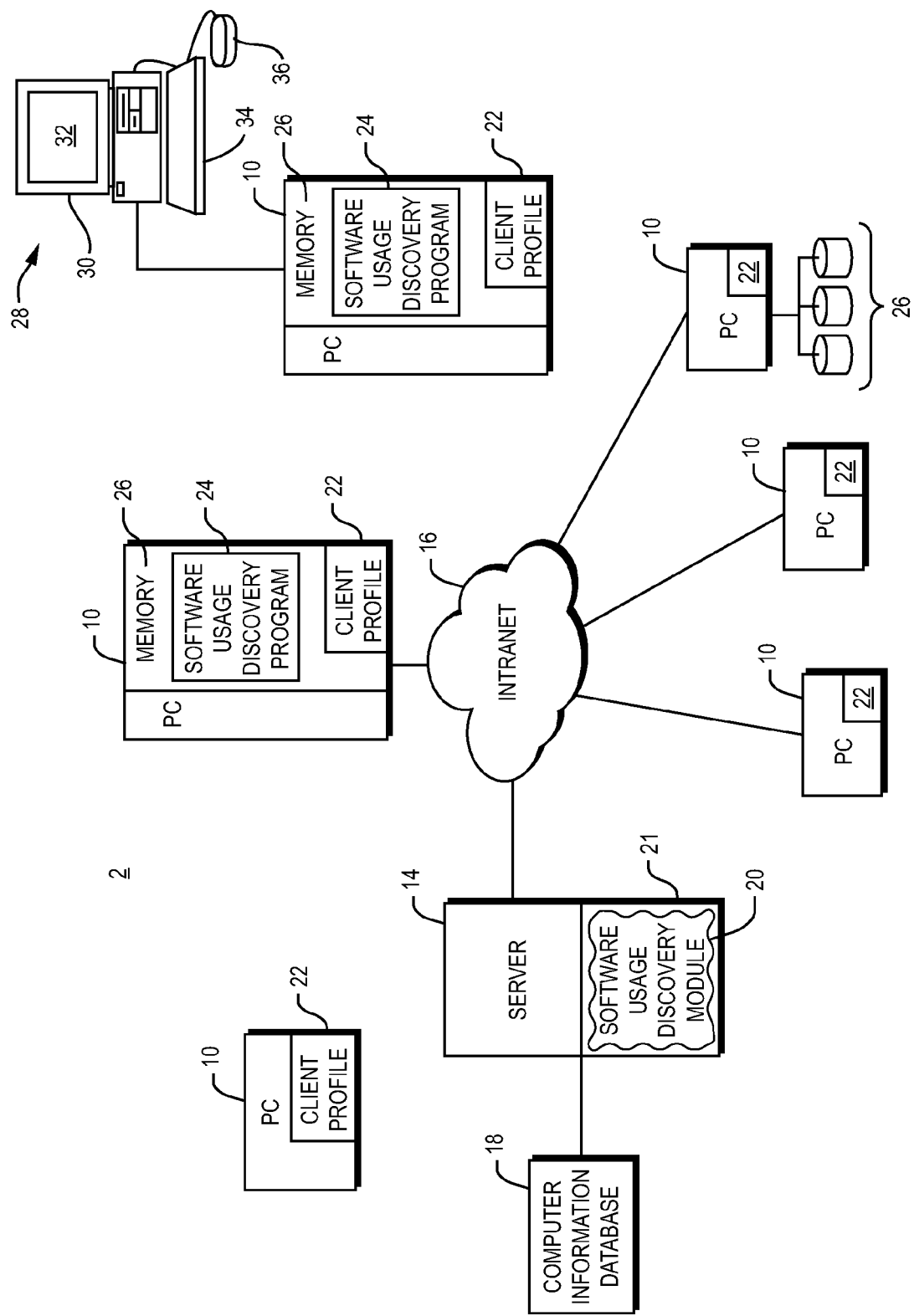
FIG. 1 is a functional block diagram of an illustrative system with which the present invention can be advantageously employed.

FIG. 1 is a functional block diagram of an illustrative system with which the present invention can be advantageously employed. FIG. 1 depicts a system 2 that includes a plurality of client computers 10 in communicating relationship with a server 14. The computers 10, some of which may be workstations, laptops, servers or other devices (not shown) communicate over, for example, an intranet denoted by reference character 16. It should be understood, however, that the present invention is not limited to a network by which the computers are connected by an intranet, but can be advantageously employed with a set of computers connected by another type of computer network, such as a point-to-point link, shared local area network, wide area network, or virtual private network implemented over a public network, such as the Internet or coupled in communicating relationship in another fashion. In addition, the present invention is also applicable to individual computers.

The server 14 may perform a number of functions but in particular, the server 14 is a software discovery server in accordance with the invention, which communicates with a computer information database 18. The computer information database 18 contains, among other things, computer profile data for the computers in the system that are connected by intranet 16 or other communication mechanism with the server or the database. Illustratively, the computers 10 run client profile software that, at the respective computers, collects profile data and uploads the data to the server 14. The software running on each of the client computers is denoted in FIG. 1 as client profile software module 22. A software usage discovery program 24 is also loaded into the memory 26 of the client computers 10 in accordance with the present invention. Additionally, the server 14 contains a corresponding program 20 in its memory 21.

One system with which the present invention may be illustratively employed is that which is disclosed in commonly owned U.S. patent application Ser. No. 10/627,191 of Newman, et al. for a GROUPING OF COMPUTERS IN A COMPUTER INFORMATION DATABASE SYSTEM, filed on Jul. 25, 2003, which is presently incorporated by reference herein in its entirety, which provides a system for profiling computers that gathers computer profile data and groups the computers according to primary and secondary grouping criteria for purposes of reporting the data.

In accordance with an illustrative embodiment of the invention, the computer profile data is examined to find usage data for application executable files. Such data contained in the computer profile data, if any, is extracted for use accordance with the present invention. The present invention can be used as an add-in for that program or with another type of program.

The database 18 is used for storage of the computer profile data for the network 2, but each individual computer may have a disk assembly 26 (FIG. 1) or other storage devices, within or directly attached to it as a part of its overall memory. The storage devices 26 are typically disk drives organized as a disk array, wherein the term "disk" commonly describes a self-contained rotating magnetic media storage device. The term disk in this context is synonymous with hard disk drive (HDD) or direct access storage device (DASD). In addition, each client computer 10 has its own in-core memory 26. Also associated with one or more computers 10 is a workstation 28 that includes a display 30 having a screen 32 upon which graphical user interfaces (GUI) in accordance with the invention, as described further hereinafter, are displayed. The workstation 28 may have a wireless or wired keyboard 34 and mouse 36, for user-entered command line interfaces (CLI) and other user interactions.

As will be well understood by those skilled in the art, an "executable" file is a file that causes the computer to execute or perform indicated tasks according to the encoded instructions. In contrast, other files only contain data. In accordance with the present invention, the first step is a collection step whereby each client computer 10 collects information about the last use of application executable files installed in the memory of the computer using a number of methods, as discussed below. The client computer aggregates the usage data and creates a data storage chart that is referred to herein as a "software item," for each method for each executable file. The software items are then organized into a list, and the software items relating to the same executable file are merged to generate a single record for each respective executable file.

An exemplary software item in accordance with the present invention is illustrated in FIG. 2, which illustrates the usage data that are collected for a particular application executable file in, for example, a software program in accordance with an illustrative embodiment of the invention. Specifically, the first item of information 202 is the file name, which is the name of the executable file (.exe) of the particular application program being examined. Then, the next block of information 204 is the directory in which the file is located. LastUseTime block 206 specifies the date and time the executable was last started. This can be set forth in Greenwich Mean Time (GMT) or another suitable time zone designation. LastUseUser block 208 is a string specifying the security identifier (SID) of the user who last started the executable. The LastUseTime and LastUseUser blocks may be individually unset when the corresponding information isn't discovered. Comparison of an unset LastUseTime to a set value of LastUseTime is defined so that an unset value is considered to be earlier than a set value.

Referring again to FIG. 2, the LastUseMethod is the next block 210. In accordance with the software discovery program of the present invention, the client computer uses up to five or more different methods of determining the last use of an executable. The method of determining the last use is indicated in the chart 200 of FIG. 2 by an integer from 0 to 5. This integer indicates which method of determining last use was utilized for that particular software item. Thus, there are separate software items for each method of discovery for the same executable if the method yields usage information. For example, there may be a no usage discovery method (MethodNone) (0), a last accessed method (MethodLastAccessed) (1), a user assist method (MethodUserAssist) (2), a Prefetch method (MethodPrefetch) (3), a method indicating that the application is running (MethodAppRunning) (4), and an indication that the application is automatically started without user action (MethodAppStartUp) (5). Each of the methods is described in further detail below. Other methods may be implemented while remaining within the scope of the present invention.

To summarize, in an illustrative embodiment of the invention, the system of the present invention uses five complimentary methods to extract usage data for executable files from the operating system based upon discovering last use data for a subset of executable files with some of the resulting data being more reliable or complete than others. To obtain the most complete and accurate representation of usage data regarding application executable files, therefore, one or more of the methods is used (typically, each method is used) and the results are combined.

Each of the methods to determine last use will now be discussed in greater detail. The "MethodLastAccessed" retrieves the last accessed time, or time stamp, for executable files discovered by the software discovery process (which defines the set of executable files of interest). The last accessed time is maintained by the file system, and it is readily recovered for the files on the individual computer or network of computers. In the case of executables, the last accessed time often represents the last time the file was run since there is little need to otherwise access the file. However, simply opening an executable file for read access will update its last accessed time. More specifically, poorly designed back up or antivirus software, which may open an executable but not run it, can render the timestamp an incorrect indicator of last use. Another example of such circumstances is that there are times when Windows® reads an executable file to show it's icon in Windows Explorer®. This would result in a new timestamp, but does not accurately reflect the last use time.

The "MethodLastAccessed," is a useful indicator in a number of cases. Additionally, if it is known that there are no significantly interfering activities on a system, it can be used as a fallback when none of the other more reliable methods apply. When used in a Windows application, the MethodLastAccessed is retrieved using the Windows GetFileTime( ) or FindFirstFile/FindNextFile( ). In the Belarc implementation referred to above, for example, such functions are called to retrieve file sizes, so the last accessed time stamp is provided as part of that information. The invention can also be readily adapted to obtain a last time stamp from other operating systems in other applications of the invention since a last accessed timestamp is available on most operating systems for particular application executable file being used by the computers or computer networks.

As discussed above, there are situations when last accessed time is not a useful indicator of last use. In such situations, as may be decided by an administrator, the last accessed method is not used and is instead replaced with the no usage discovery method, "MethodNone", so that at least one software item is always present for each discovered application executable. A MethodNone item has unset values of LastUseTime (206) and LastUseUser (208).

Another method by which the present invention performs usage discovery is referred to herein as "MethodUserAssist." This method examines the UserAssist keys in the Windows® registry to determine usage information for executable files launched in various ways by Windows Explorer®. More specifically, starting with Windows 2000® (and Windows98®) the Windows Explorer program records usage information for applications launched by double-clicking the application's executable file (or a shortcut to it) in Windows Explorer®. In addition, opening a document file associated with an executable by typing an application name into the Run menu, or starting an application from its Windows® start menu shortcut will also generate a persistent UserAssist record. Thus, this method covers the most common ways that users invoke applications, however, it is noted that the Microsoft® operating systems do not document the UserAssist keys but they are apparently used to support the most recently used list of applications in the start menu. This record includes the date and time that the program had been launched, and the user account used to launch it.

There are some instances in which this method does not result in the information needed about the last use of the executables, and in such a case, one of the alternative methods can be used. For example, this method does not record usage information for applications launched via the Windows Quick Launch toolbar. Thus, performing several different types of methods of last access allows the greatest spectrum of information to be extracted regarding a particular executable.

The next method is "MethodPrefetch." This method examines files in the Windows PreFetch folder to determine the time of last use for executables that have been recently run. Starting with Windows XP®, the Prefetch feature was included to reduce application startup time by anticipating and preloading DLLs. A DLL is a Dynamic Link Library, which is a file of code containing functions that can be called from other executable code (either an application or another DLL). Unlike an executable (.exe) file, a DLL cannot be directly run. DLLs must be called from other code that is already executing.

The Windows Prefetch function preloads DLLs that are expected to be accessed shortly after an application begins execution. Windows® determines such DLLs by monitoring each execution of every application for 15 seconds after execution begins and records the DLL usage in special ".pf" files saved in a special folder for that purpose. Included within each such ".pf" file is the full path of the executable and a timestamp showing when it began execution. It is not usually necessary, however, to read the .pf file's contents because its last modified time closely reflects the application execution start time and it is named in a manner that allows ready identification of the executable. Since most executables started are monitored in this way, it is a good indication of recently used applications. There is, however, a limit to the number of files contained in the .pf folder, and the files contained therein are sometimes pruned out by, for example, system boots. Thus, the Prefetch method does not always provide complete usage for all applications actually used, but it is a good indicator of last usage for many applications. Further details regarding the PreFetch method are discussed below.

The next method of determining last usage of an executable is "MethodAppRunning." In this method, the computer or network of computer is queried about currently running applications. In all versions of Windows®, it is possible to enumerate running processes to provide coarse usage information about the application executable files running in them. The fact that the respective processes are currently in use is itself an indicator of last use. In later versions of Windows® it is also possible to determine the process owner and the actual start time of each running process, thus providing more detailed usage information.

This method yields immediate usage information, but only for those executables that are then running. It is a good compliment to the method MethodPrefetch, because, as noted, there are times when an executable is either not prefetched, or may have been pruned from the PreFetch folder, but still in use, i.e., when the executable is left running for days or even weeks.

As one solution, process enumeration is performed using the Windows CreateToolhelp32Snapshot( ), Process32First and Process32Next( ) functions. The latter two return the process identifier (PID) of each running process along with the name of the executable file for the process. On Windows 2000 and later, the PID may then be used to obtain a process handle from which the start time and owner SID of the process may be found. Additionally, the PID allows this method to obtain the full path to the executable using Module132First( ) in Windows Vista and later. Referring still to FIG. 2, the software items specify if the application was determined to be running. Illustratively, for MethodAppRunning there may be a Boolean indication 212 showing that the executable was found running, or not, at the time of discovery.

The other method of determining last usage of an application is the "MethodAppStartup" method. This derives usage information about applications that are known to start running automatically when a user logs on. When a user logs on to Windows, certain user-specified (or administrator-specified) applications are started automatically. Thus, the program of the present invention assumes that such a "startup" application was run at least as recently as the last logon time for that user. From this information, the last use and last user can be derived regarding such applications, even if they are not currently running. A place to find such application information would be in the registry "Run" keys, including the Active Directory and the "Legacy" varieties. Also, the Startup folder in a user's Start menu, including the all-users Start Menu, may also contain such information.

Referring still to FIG. 2, there may be a Boolean flag 214 which indicates whether the executable is registered to run as a service. Any method may include checking whether an executable is a service because services can be set to start running automatically when the operating system boots. In the preferred embodiment, the IsService flag is only set by the MethodNone and MethodLastAccessed methods. Whether a software item is a service is relevant, and used in records, to distinguish between executables that are run automatically and executables that are run by user interaction.

After the discovery methods have been applied, the result is a list of software items containing usage data for executables discovered on the computer. Further, if a computer profile from a previous discovery cycle is available, post-merge process usage data from that profile's software items are also added to the list when not superseded by more recent data. Each executable file can have multiple software items in the list, which include data for all the software programs, including the application executable files that comprise the software program that are installed or running on the computer. The client computer next sorts the software items in a suitable manner, such as alphabetically by path name. A merge process is then applied to the sorted list. Thus, in accordance with the invention, the software items on the list are merged such that each executable has a single software item on the list. With respect to a software item's appearance on the list, both short and long Windows file path notations are considered to be equivalent. Adjacent items are compared and when two adjacent items refer to the same file path, the following queries are applied to merge the adjacent software items in accordance with the present invention:

1. If one item's method of last use is MethodLastAccessed and the other is not, then the MethodLastAccessed item is discarded;
2. Otherwise, if the difference between the two item's LastUseTimes is greater than some threshold (illustratively 30 seconds), then the earlier item is discarded;
3. Otherwise, if the difference between the two item's LastUseTimes is less than or equal to that threshold (illustratively 30 seconds), then the item that has no LastUseUser value is discarded, and the one having a valid LastUseUser value is retained;
4. If the discarded item has the IsRunning flag set, then the flag is transferred to the retained item; and
5. If the discarded item has the IsService flag set, then the flag is transferred to the retained item.

The resulting merged list of software items may be uploaded to the server 14, and retained as records in the associated database 18, to report usage network-wide such as on the computers in the network or on a subset or group of the computers in order to determine for example, a network-wide number of recent users of a particular program or version thereof. Other items of information may include where in the network is the greatest concentration of usage and so forth.

The resulting list of software items may be utilized on a given computer, to record that computer's usage. Alternatively, or in addition, in one embodiment, the network is represented as a hierarchical system having a group hierarchy that is configured to mimic the organizational authority structure of its users, such that the structure resembles an organization chart. The usage information is included as part of the reports produced for the various groups. The grouping of the computer profile data also serves the function of regulating user access rights within the BelManage® product. Each BelManage® user has access only to profile data (and thus reports) associated with a designated BelManage® login group and sub-groups thereof.

Figure 3:
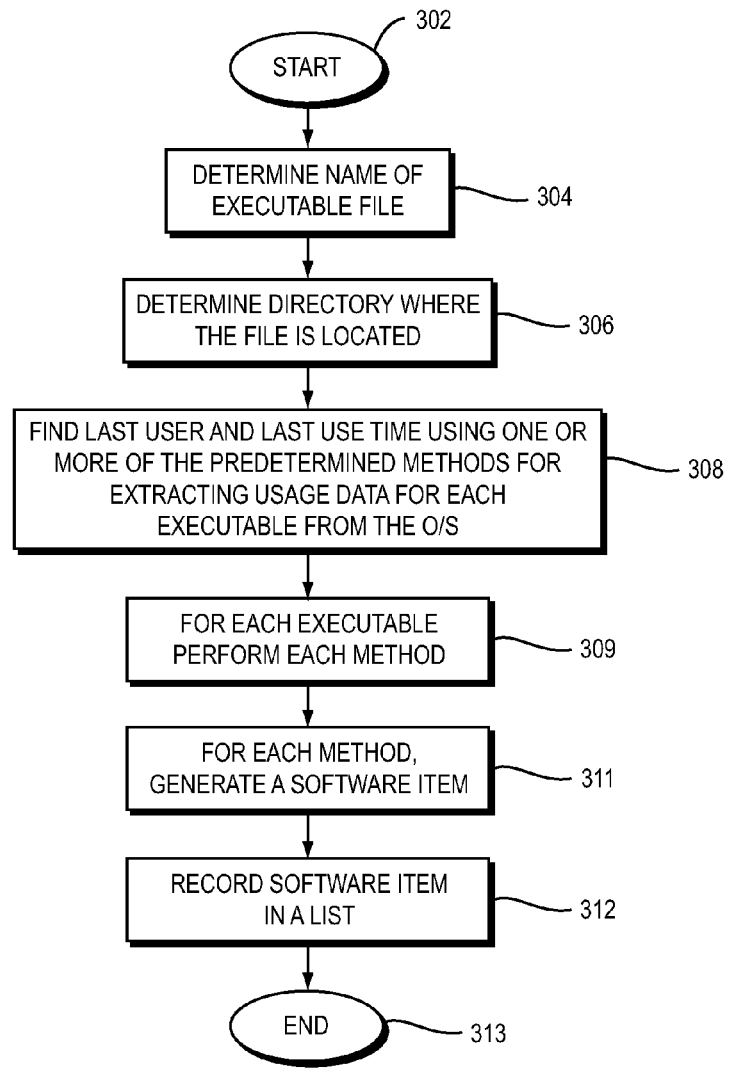
FIG. 3 is a flow chart of an illustrative procedure by which the client computer discovers executable files, and generates a software item for each executable file.

This method may be further understood with reference to FIG. 3, which is a flow chart 300 of an illustrative procedure by which a client computer discovers information about a single application executable files and generates a software item for each method of discovery for each executable file installed on the client computer. The program begins with the start step 302 and continues to step 304, which is to determine the name of the executable file in question. In step 306, the directory where the file is located is determined. Next, in step 308, the last user and the last use time is found using each of the predetermined methods described above for extracting software usage data for each application executable from the operating system. For each application executable, the methods described above are performed to obtain as much information as possible about each executable in step 309. A software item is generated for each executable as shown in step 311. Each software item is then recorded in a list in accordance with step 312. The procedure ends at step 313.

Figure 4A:
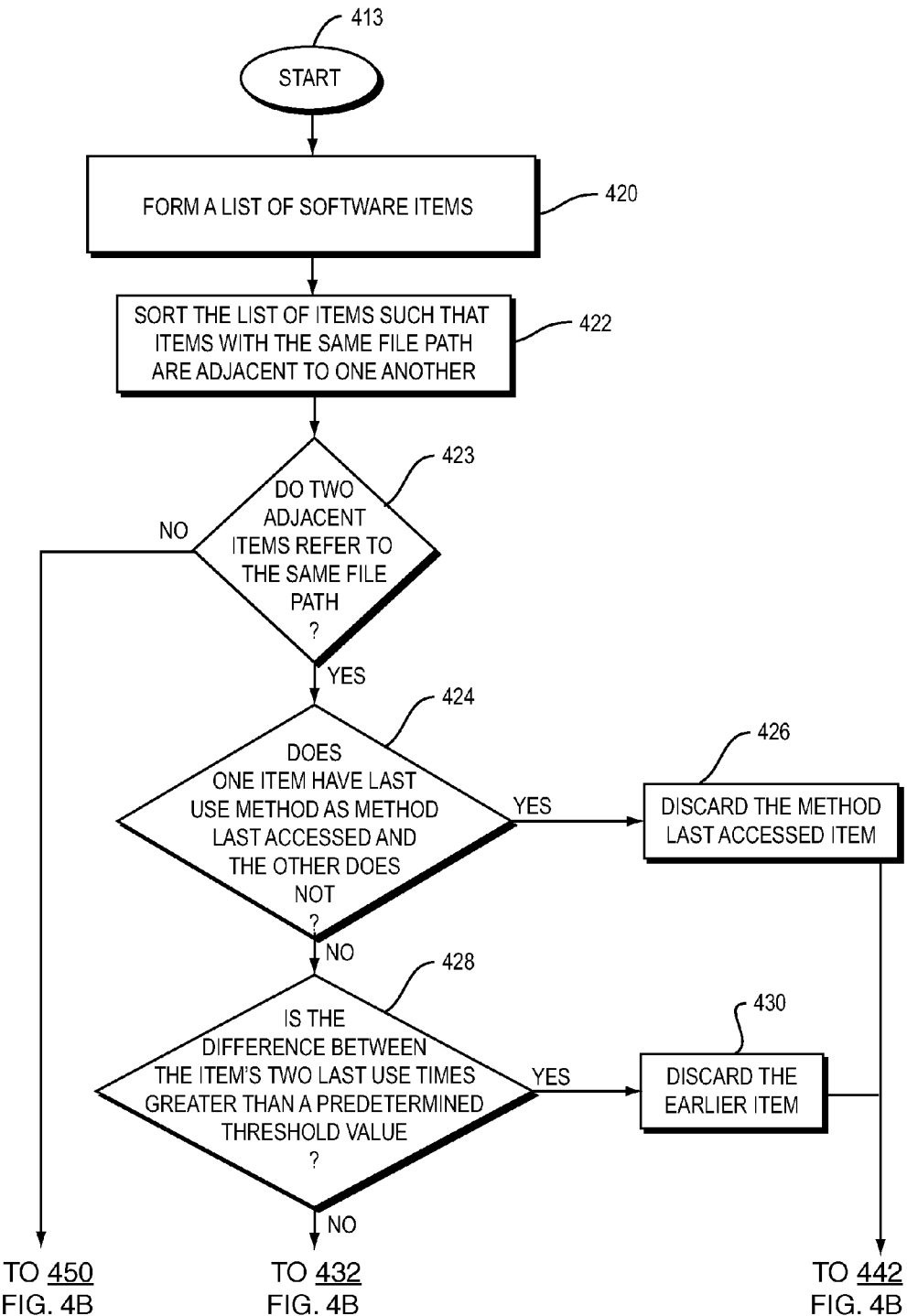
FIGS. 4A and 4B together form a flow chart of a procedure by which the client computer merges software items that relate to the same executable and generates a record in accordance with an illustrative embodiment of the method of the present invention.
Figure 4B:
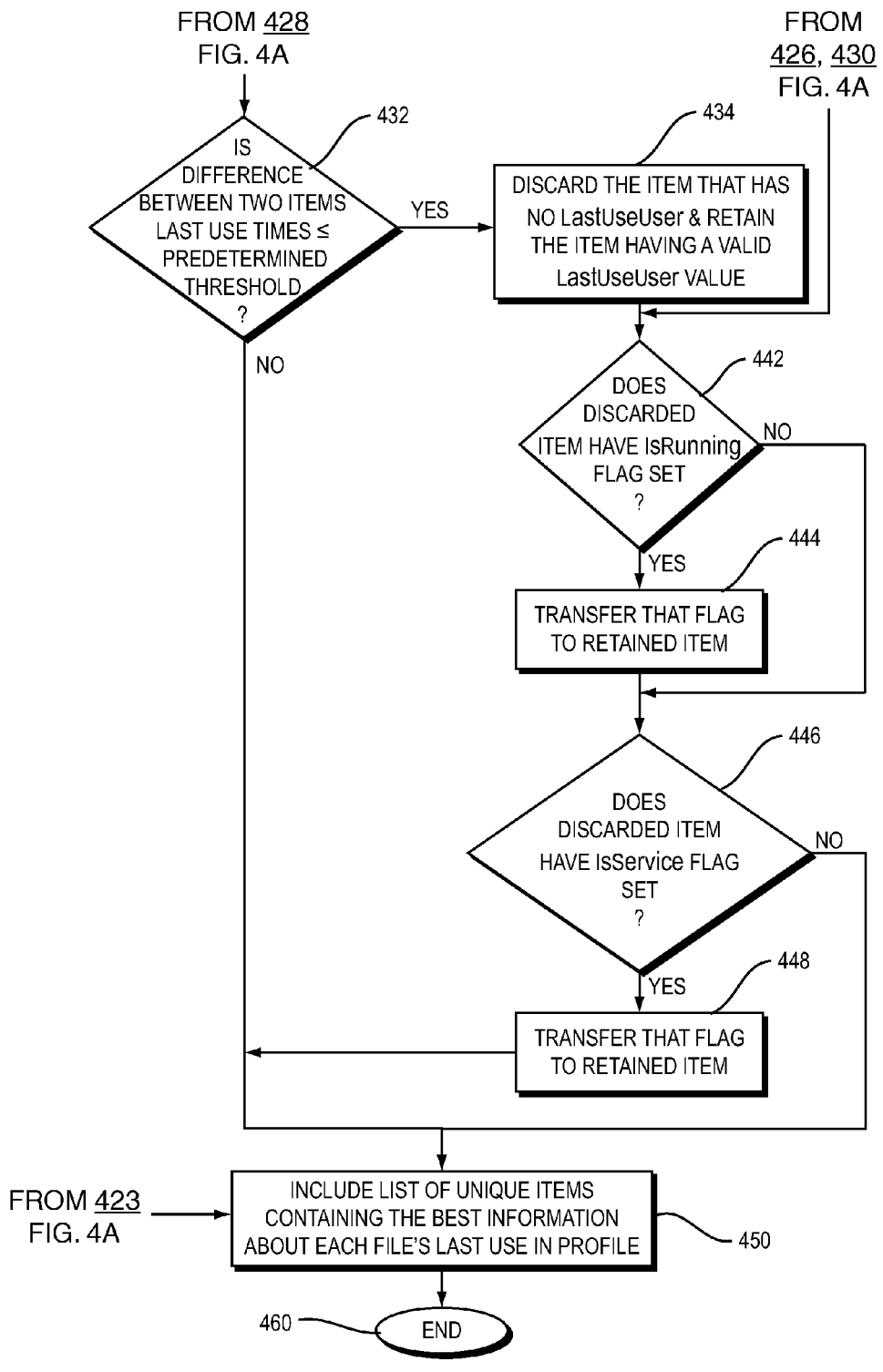

FIGS. 4A and 4B together form a flow chart of a procedure by which the software usage discovery program running on each client computer generates a list of software items generated in the procedure of FIG. 3, and for merging the list of such items in accordance with the present invention. The procedure begins at the Start step 413 and proceeds to step 420. At step 420, a list is formed including each software item representing each software executable that is installed on the client computer using the procedure in chart 300 (FIG. 3). In step 422, the list is sorted such that items that have the same file path are placed adjacent to one another in the list.

The first two datum of chart 200 (202 and 204) are compared for adjacent items in step 423. As noted above, if one item's method of last use is MethodLastAccessed and the other is not, then the MethodLastAccessed item is discarded as shown in steps 424 and 426. Otherwise, if the difference between the two item's LastUseTimes is greater than some threshold (illustratively 30 seconds), then the earlier item is discarded as shown in steps 428 and 430.

The merge process continues and the client computer compares adjacent items on the list that refer to the same file path name. This is performed so that each application executable file, or version thereof, appears only once on a final list. A series of substeps, which are queries that are applied to adjacent items that have the same file path, are performed as part of the merge process. For clarity of illustration, these queries are shown as separate steps in the flow chart of FIGS. 4A and 4B.

A first query at step 423 is whether two adjacent items refer to the same file path. If they do, the procedure follows the YES path to query step 424. Step 424 queries whether one item has a last use method as a "MethodLastAccessed" and the other does not. If so, then the YES path is followed to step 426, which is to discard the method last accessed item and then the procedure continues with step 442. (FIG. 4B) If it is not true that one software item has a "MethodLastAccessed" and the other does not, then the NO path is followed to query step 428, which asks whether the difference between the two item's last use times is greater than a predetermined threshold value that is set by the system administrator. If the difference is greater, then the YES path is followed to step 430, which is to discard the earlier item and then the procedure continues with step 442.

If the difference in times is not greater, then the NO path is followed to query step 432. Step 432 is a query whether the difference between the two item's last use times is less than or equal to the predetermined threshold. If so, the procedure flows to step 434, which is to discard the item that has no last use user and retain the item having a valid last use user value and then the procedure continues with step 442.

If the answer to query 432 is NO, then the procedure moves to step 450, which is to record a list of unique items containing the best information that is available about each executable file in the computer profile for that computer.

Returning to steps 434, 426, or 430, which provide for an item to be discarded, the YES path on the right hand side of the flow chart is followed such that the procedure continues to step 442, which is a query step asking whether the discarded item has an IsRunning? flag set. If so, the item's flag is transferred to the retained software item and the procedure goes on to perform step 446. If, on the other hand, the item does not have an "IsRunning?" flag set, then the NO procedure follows the path to query step 446, which asks: Does the discarded item have an "IsService?" flag set. If so, then the procedure flows to step 448 which is to transfer the flag to the retained software item, and continue with the procedure to step 450. In step 450, a list of unique items containing the best information about each executable file's last use is included in the computer profile and then the procedure ends at step 460. If the item does not have an IsService flag set, the procedure flows to step 450.

Returning to step 423, which is a query step that inquires whether two adjacent items refer to the same file path, if the result is No, then the process continues to step to step 450, which is to record a list of unique items containing the best information that is available about each executable and including that information in the computer profile.

When all retained items are included on the list, such that each executable appears only once on the list, the list is included in the computer profile at step 450 and the procedure ends at step 460 until the next time that the administrator chooses to analyze the software, i.e., the application executable files, that are installed on the computer in the network of computers. The computer profile may be sent to the server 14, which stores the information in database 18 as part of the computer's profile data as a database record. The administrator may request reports that summarize this information.

In accordance with a further aspect of the invention, the process can be performed on a per executable basis. In such an alternative process, the sorting step 422 and the adjacent comparison of adjacent items 423 could be omitted and the process can be continued for each executable, which process is summarized as follows: A. creating an item for one method, B. discover using a second method, C. merge the results from the second method with the first into one item again, D. repeat B and C again for other methods until the information desired for a given executable is determined.

Moreover, the procedure 400 (the flow chart of FIGS. 4A and 4B) or the per executable procedure may be set to run automatically every day, week, month, or other regular time period to produce the list of software and related information about each software item's usage. This description of the procedure relates to a network of client computers that are interconnected to a server computer, however, it should be understood that the process and system of the present invention can be readily adapted to perform the stated steps on an individual, stand alone computer in accordance with the present invention. Furthermore, the procedures have been described in such a manner that the client computer generates the software items and performs the merge process. In an alternative embodiment of the invention, the server may be programmed to perform the steps of generating the profile from the software items, which have been uploaded to the server from the individual client computers. Additionally, or alternatively, the server may be programmed to perform the merge process. In addition, the steps illustrated in the figures and described herein are illustrative of aspects of the invention, and not limiting thereto. It should be understood that in certain applications of the invention, the steps can be performed in a different order, and/or steps can be omitted or repeated as desired.

When the software items in the list have been merged in this way, the final result is a list of unique items, one per application executable file, containing the best information about each file's last use. A report can then be generated which sets forth the information in a format desired by the user. Several examples of this are provided below. Alternatively, the list or portions thereof may be included in a more detailed report of other computer profile data for the computers being managed by the system of the present invention. In the report, when a software program is comprised of several executables (each being the same publisher's company and product name) a single aggregated entry may be shown to represent the entire set. That entry shows the data for highest software version found in the set. A link can be provided to a more detailed report for each executable in the set, if desired in a particular application of the invention.

Illustratively, the report's displayed usage data will be for the aggregated entry from the most recently used executable, unless that executable is registered as a service that starts automatically. In that case, the displayed usage data is from the most recently used non-service executable. The non-service executable may be of greater significance because it represents active use of the software program by a user, rather than automatic use by the system. For a similar reason, the logic used to prefer non-service over service executables is also applied to "start up" items where the last use method is the method of application automatic start up. In addition, a single computer profile summary report can be created locally on a single computer, in which case information is displayed locally from the memory of the user's computer via the user's web browser.

Figure 5:
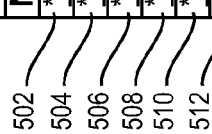
FIG. 5 is a chart illustrating usage graphics which are employed to indicate time of last use in accordance with an illustrative embodiment of the present invention.

FIG. 5 is a chart illustrating a method of displaying software usage in terms of recency of use. The chart 500 indicates time of last use in accordance with an illustrative embodiment of the present invention. For example, item 502 is an underscored asterisk and exclamation point which indicates that one or more of the executables, that may be part of a suite of executable files, comprising a software program is currently running. As shown in row 504, an underscored asterisk with a Roman numeral I illustrates that the most recently used of the executables comprising a software program were last used within the past week, but none are currently running. An underscored asterisk with a Roman numeral II as shown in row 506 means that the most recently used of the executables comprising a software program were last used in the past 90 days, but longer than one week ago. Row 508 includes an underscored asterisk and a Roman numeral III to indicate that the most recently used of the executables comprising a software program was last used within the past year, but longer ago than 90 days. Item 510 is an asterisk with four I's (IIII) to indicate that the most recently used of the executables comprising a software program was last used over one year ago. And finally, as shown in row 512, an underscored asterisk indicates that the last use is unknown and the executables comprising a software program may never have been run.

Figure 6A:
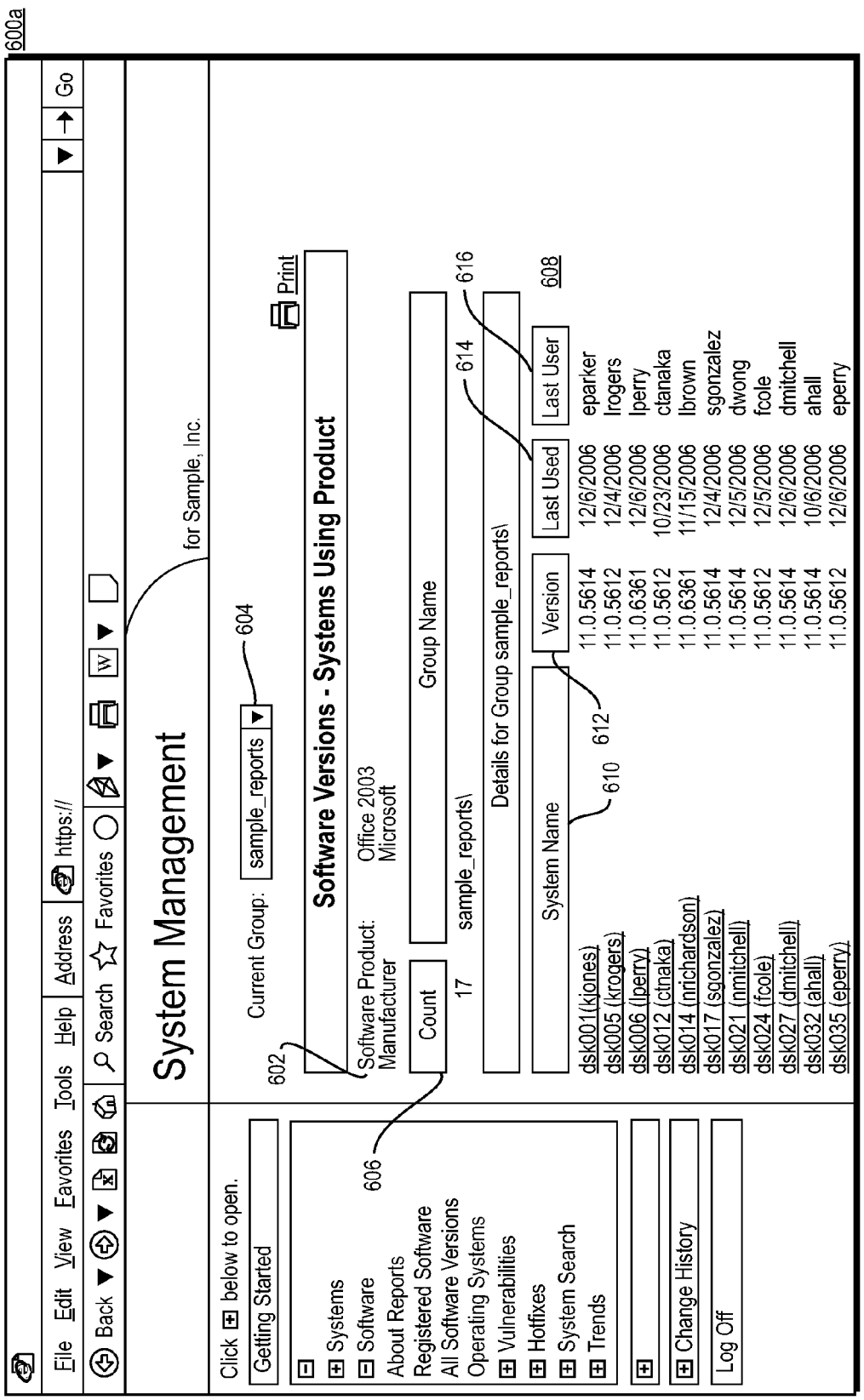
FIG. 6A is a graphic user interface for depicting software versions for a computer or a network of computers using any application executable file that may be part of a suite of executable files that make up a particular software program in accordance with an illustrative embodiment of the present invention.

Examples of reports that are generated by the server and displayed in graphic user interfaces that are designed in accordance with the present invention are depicted in the illustrative graphic user interfaces of FIGS. 6A through 9. FIG. 6A is a graphic user interface (GUI) 600*a* for depicting software versions for computers using a particular software program in accordance with an illustrative embodiment of the present invention. FIG. 6B is a graphic user interface relating to the computer networks using a particular software version. Returning to the report of FIG. 6A, the software program 602 is Microsoft® Office 2003. The current group is "sample reports," as shown in the pull down window 604. Column 606 provides a count of 17 instances of this software program being used in computers in this group. The GUI also includes, illustratively, a column for computer System Names 610, version 612, date of last use 614 and last user 616. Thus, this type of report is illustratively entitled: Software Versions—Systems Using Product. As shown in FIG. 6A, the report provides the name of the computer or network of computers, the version number of the Office 2003® version being used, the date of last use and the last user. This report can be generated by selecting, illustratively, clicking on a product's name in the "All Software Versions" report (not shown). It can also be selected using other identifiers which remain within the scope of the present invention.

Figure 6B:
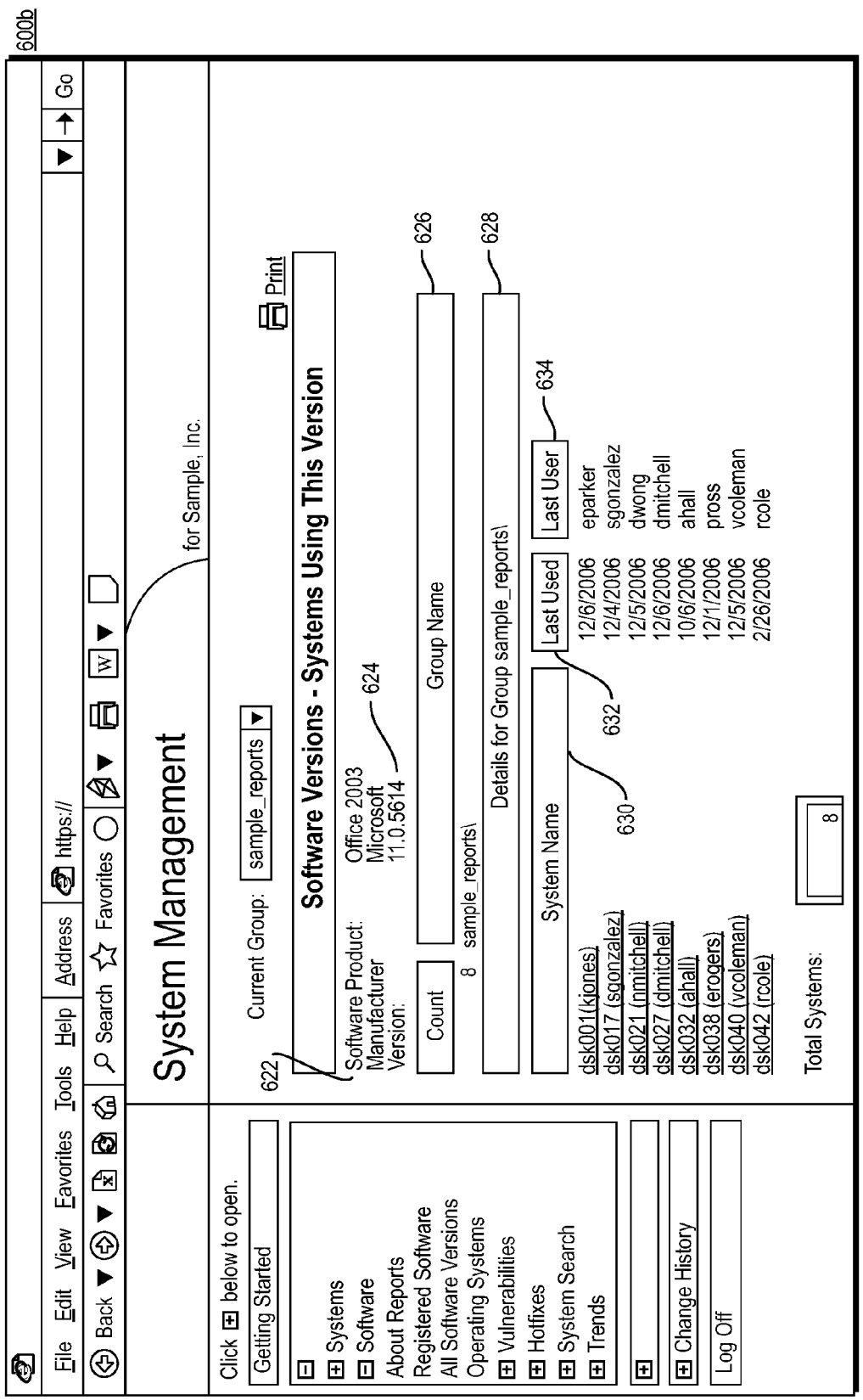
FIG. 6B is a graphic user interface for depicting software versions for computer systems using a particular software version in accordance with an illustrative embodiment of the present invention.

FIG. 6B is a graphic user interface 600*b* for depicting systems using a particular software version in accordance with an illustrative embodiment of the present invention. The software program 622 is identified as Office 2003 manufactured by Microsoft®. The version number 624 is 11.0.5614. As shown in the report summary section 626, eight computers use this version. The Details section 628 contains the system of each computer using that particular version, as shown in column 630. The date of last use is shown in column 632, and the last user is shown in column 634.

Thus, this report lists those computers within the selected group that have a specific version of a given software program installed. The report contains the date of last use and the name of the last user. The report is generated when a user clicks on a version range in the All Software Versions report (not shown). Then, the user can click on a specific version number in that report. In alternative embodiments of the invention, there may be other techniques by which this report can be selected and/or presented.

Figure 7:
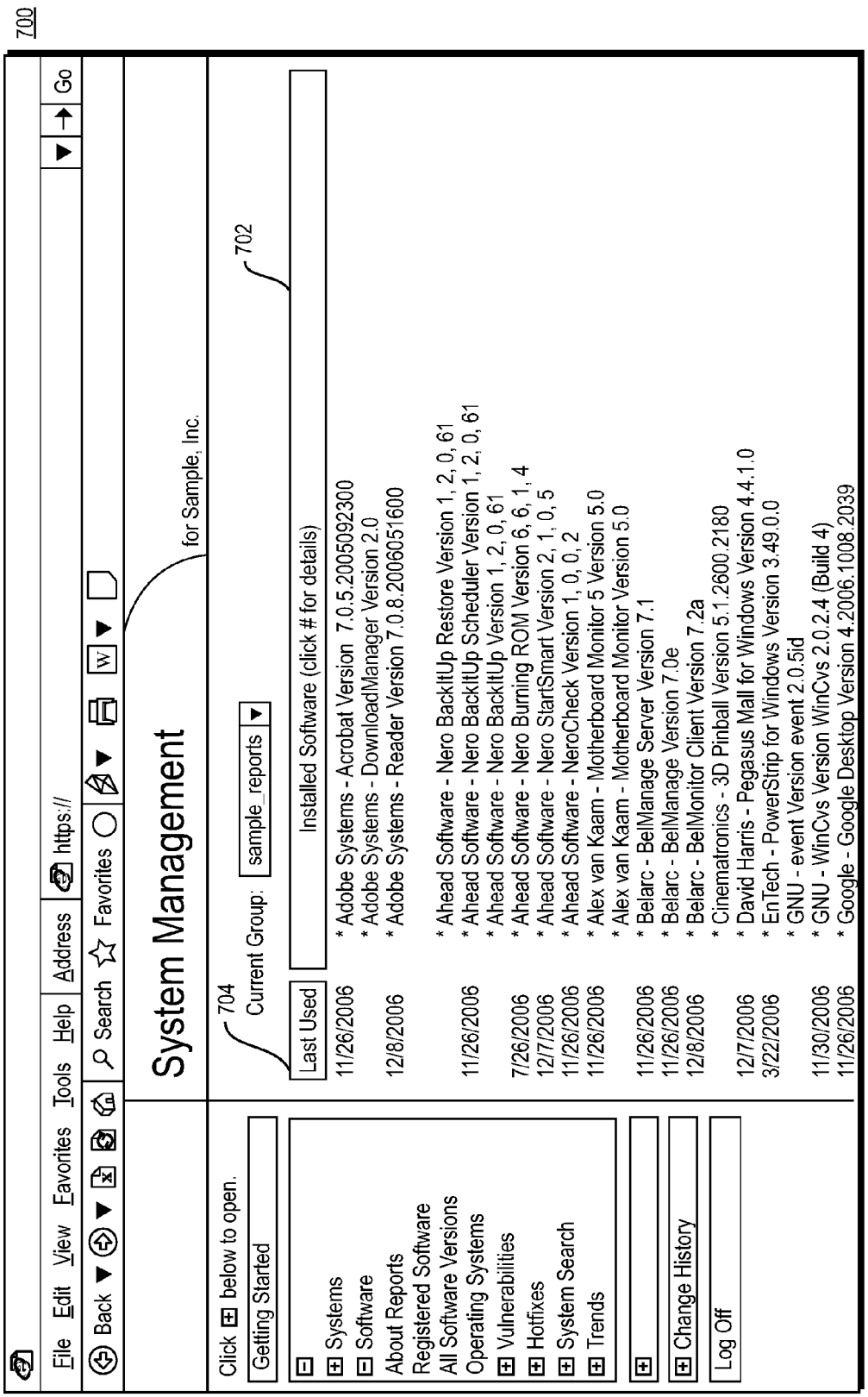
FIG. 7 is a graphic user interface for depicting the installed software section of a computer profile summary for computer profile data.

FIG. 7 is a graphic user interface 700 for depicting the installed software section of a computer profile summary for computer profile data. The installed software is listed in column 702 and the date of last use is provided in column 704. This report is a summary of information collected from a particular computer about the software that is installed on that computer, showing also the software publisher company, the software program name and the version number of each instance of a software program installed on the computer. This report can be illustratively contained in a computer profile summary report and may be viewed by clicking on a computer name in the System List report (not shown) in accordance with an illustrative embodiment of the invention, or it may be produced as part of another report or in many other variations as desired in a particular application of the invention.

Figure 8:
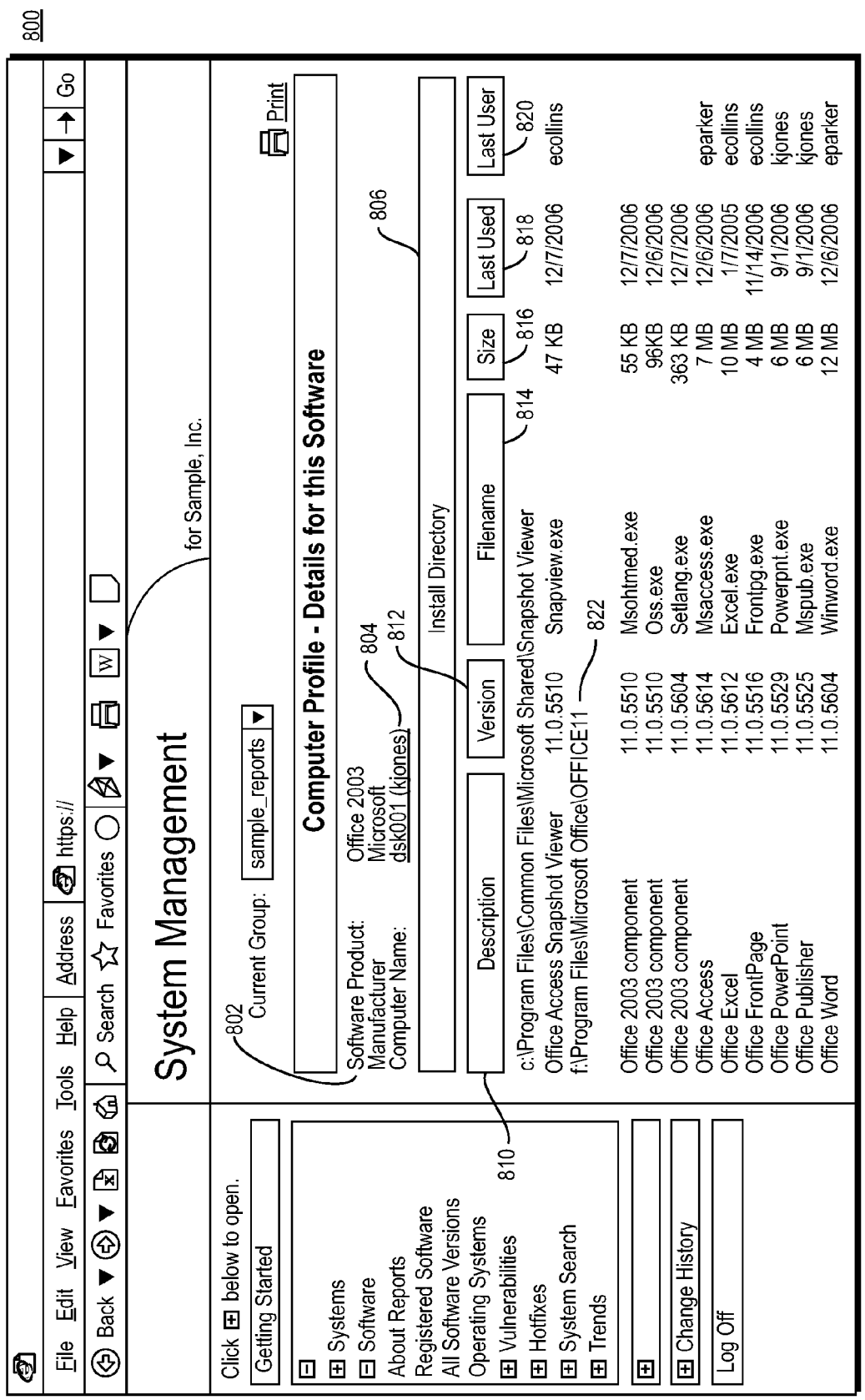
FIG. 8 is a graphic user interface for depicting details for any executable file that may be part of a suite of executable files that make up a particular software program in a computer profile in accordance with an illustrative embodiment of the present invention.

FIG. 8 is a graphic user interface 800 for depicting details for a particular software program of a computer profile in accordance with an illustrative embodiment of the present invention. The particular software being studied in the report is Office 2003 (802) manufactured by Microsoft® and the computer name 804 is provided as dsk001(kjones). One install directory for that software is provided at pane 806. The first instance of a related executable is found in the computer in the C:\drive. As shown in line 808, the directory path name for the software product is C:\Program Files\Common Files\Microsoft Shared\Snapshot Viewer. This executable has a description 810 which is listed as Office Access Snapshot Viewer and its version (812) is 11.0.5510. The executable has a file name 814 of Snapview.exe and the size 816 of the executable is 47 KB. The data of last use 818 was Dec. 7, 2006 and the last user 820 is ecollins. Similarly, a number of executables for Office 2003 are installed on the f:\drive, as shown at line 822. The executables listed there depict the information for each instance of a Microsoft Office® component installed on the computer.

In summary, this report shows the details of a specific software program listed in the Computer Profile Summary report. It shows executables comprising the software program (having the specific company and software program name) along with descriptions, filenames, sizes, versions and install directories of each. In accordance with an illustrative embodiment of the present invention, two columns show the date of last use and name of last user, if known.

Figure 9:
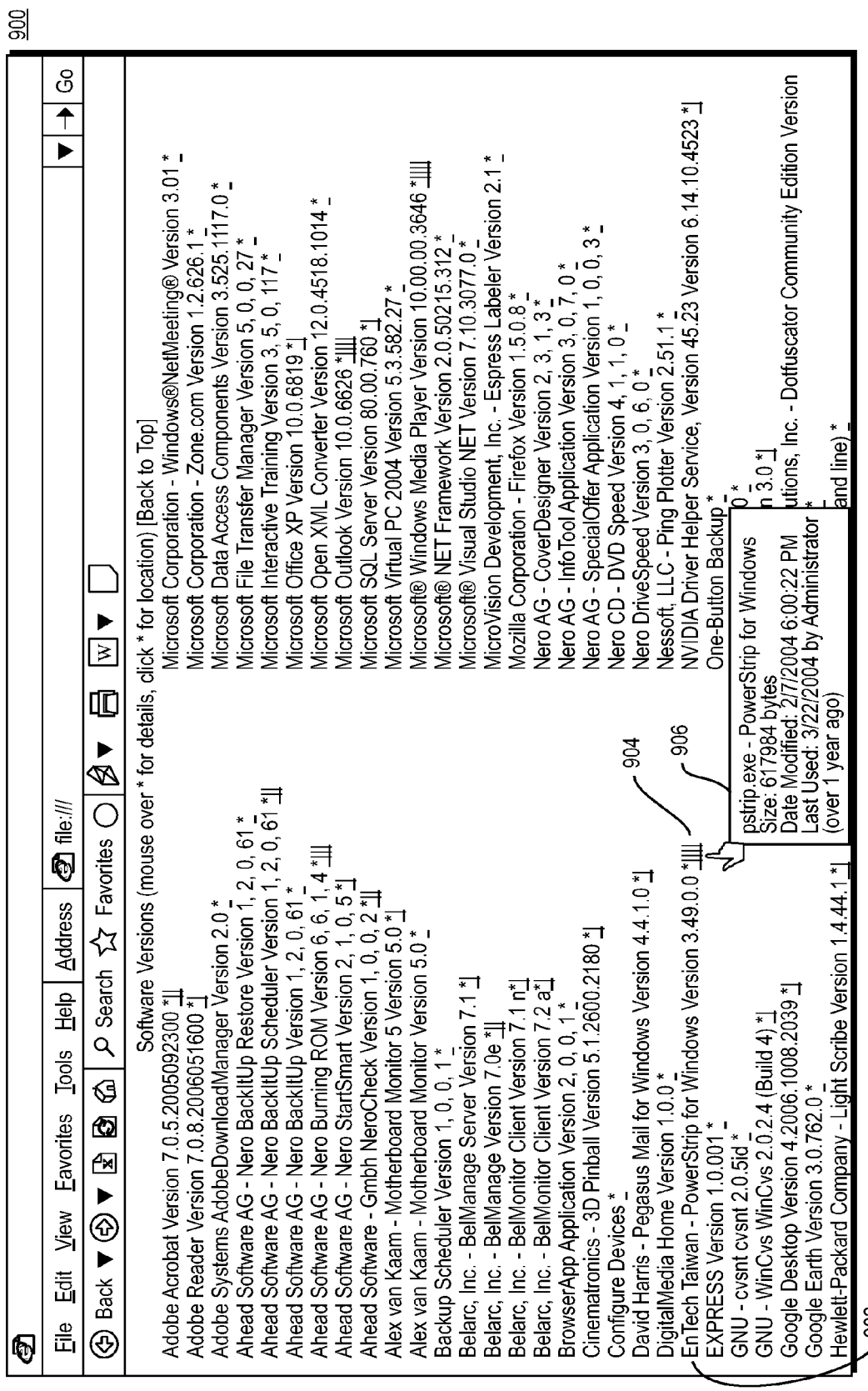
FIG. 9 is a graphic user interface for depicting the software version section of a computer profile summary for an individual computer in accordance with an illustrative embodiment of the present invention.

FIG. 9 is a graphic user interface 900 for depicting the software versions section of a computer profile summary for an individual computer. As shown in the GUI 900, each software item that is installed on a computer is listed, such as, for example, the software identified at line 902 entitled EnTech Taiwan—PowerStrip for Windows Version 3.49.0.0. Also provided is the graphic from the table of FIG. 4 indicating the time of last use. In the example, the software 902, is identified by the graphic "*IIII" (904), which indicates that the program was last run over one year ago. This allows an administrator or user to easily distinguish rarely used software from software programs that have been run recently, and are therefore more likely to be frequently used. This information can also be provided by rolling the mouse over the asterisk next to software name and an information box 906 appears and provides further information about the executable. As noted at the top of the report, if the user clicks on the asterisk next to a the software name, then the location of the software is provided. There are various other ways in which this information may be presented, while remaining within the scope of the present invention. In the example, the report is provided for an individual computer, but it can also be used for a client computer in a network of computers.

Figure 10:
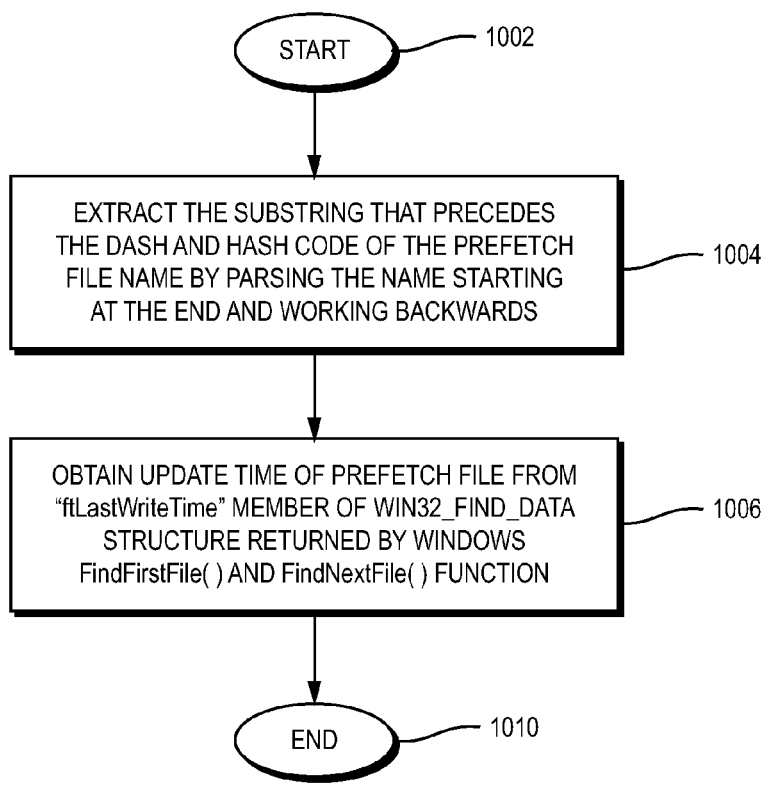
FIG. 10 is a flow chart of a procedure for obtaining information from a Windows® PreFetch file in accordance with an illustrative embodiment of the present invention.

FIG. 10 is a flow chart of a procedure 1000 for obtaining information from a Windows PreFetch file, as mentioned hereinbefore. More specifically, the PreFetch files have the extension .pf. Inspecting and parsing a .pf file can provide the name or path of the executable to which the .pf refers and the date and time that the .pf file was last updated by the Windows Task Scheduler (which indicates the last time the executable was last run).

As shown in FIG. 10, the procedure 1000 begins at the start step 1002 and continues to step 1004 which is to extract the substring that precedes the dash and hash code of the PreFetch file name. For example, the PreFetch file name is the name of the software executable itself followed by a dash and the hexadecimal representation of a 32-bit hash of the file's path and command line arguments (and followed by the .pf extension). An example is EXCEL.EXE-28297C59.pf. The executable file name, then, is trivially obtained by extracting the substring that preceded the dash and hash code. In accordance with the invention, this is accomplished by parsing the name starting at the end and working backwards. This is preferable because the name of the executable may itself contain a dash character.

Then, the procedure continues to step 1006 which is to obtain the update time of the PreFetch file from "ftLast-WriteTime" which is a member of the WIN32_FIND_DATA structure returned by the WINDOWS FindFirstFile( ) and FindNextFile( ) functions. This is the time the task scheduler updated the .pf file, and closely corresponds to the time the executable was last run. This is an efficient method of obtaining and extracting information from Windows PreFetch files, without having to open and read the file. However, since only the name of the executable is provided without path information, the technique of FIG. 10 does not work when the name is ambiguous. For example, multiple executables may exist on the same computer or network of computers with the same name but in different folders and each yields the same filename but a different hash code. In that case, in accordance with the invention, the better method is to follow the procedure of FIG. 11.

Figure 11:
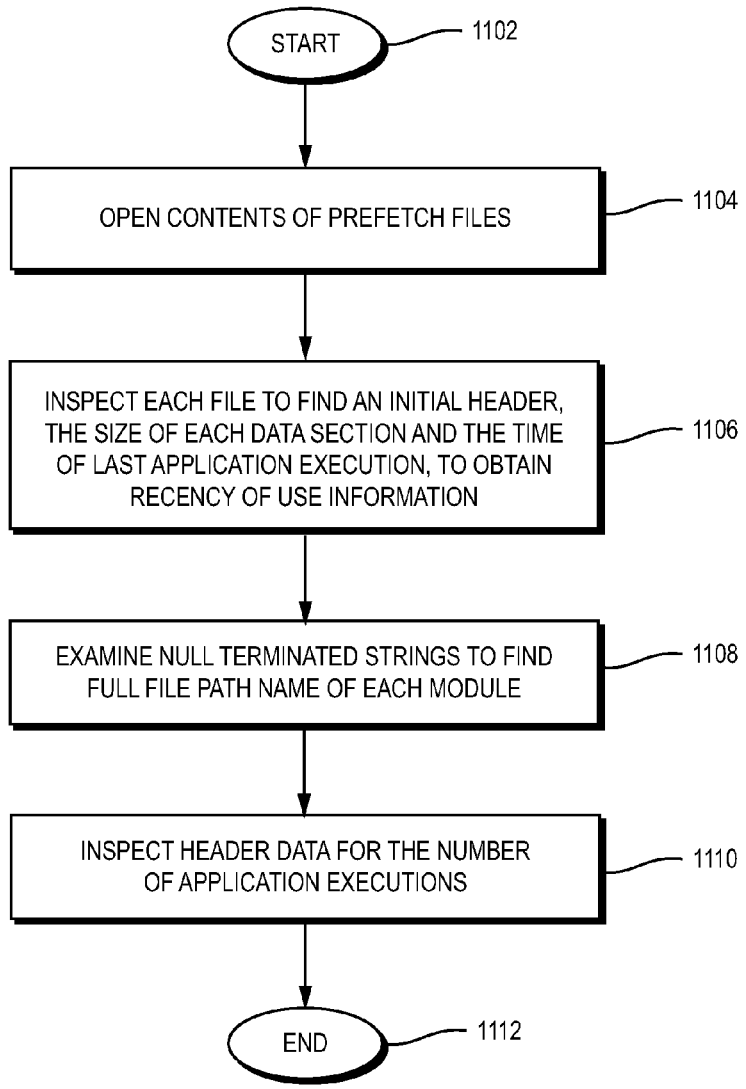
FIG. 11 is a flow chart of an alternative procedure for obtaining information from a Windows PreFetch file in accordance with an illustrative embodiment of the present invention.

FIG. 11 is a flow chart 1100 of an alternative procedure for obtaining information from a Windows PreFetch file in accordance with an illustrative embodiment of the present invention. The procedure begins with the start step 1102 and continues to step 1104, which is to open the contents of the Prefetch file. Each file relates to an executable installed on that computer. In the next step 1106 the contents of the file is inspected in order to find an initial header. The header provides file offset and the size of each data section. It also provides the time of last application execution that reflects the recency of use of the application. Then, step 1108 examines the null terminated path strings contained in the module path list, its offset and size found in the header, to find the full path name of each module. If actual usage counts are important, the procedure continues to step 1110 in which the header data is also inspected for the number of times the application has been executed since the file's creation. The procedure ends at step 1112.

FIG. 12 is a chart illustrating exemplary header data in a Windows® Prefetch File which can be advantageously employed in accordance with an illustrative embodiment of the present invention. The chart 1200 summarizes Header Data in the Windows PreFetch file. Specifically, at Byte Offset 4, there is a data word consisting of a Magic Number. As will be understood by those skilled in the art, the magic number is one way of incorporating metadata to specify a document file type or format. The magic number is four bytes long. Then, at Byte Offset 100, the data word indicates the offset to start the module path list. At Byte Offset 104, the data provides the Size of the module path list (in bytes). Then at Byte Offset 120 the time of last application execution is provided. At Offset 144, the data word provides the number of application executions.

FIG. 13 is a chart illustrating exemplary header data in the new Windows 7 operating system regarding UserAssist keys. Specifically, in Windows® 7, as in previous versions, each value in the "Count" key contains a block of binary data consisting of various pieces of information Windows® uses internally to implement features in the start menu (and perhaps other features). In accordance with the present invention the software usage discovery system seeks to determine the last use timestamp indicating when a shortcut or executable was last opened or executed (an 8-byte FILETIME), and perhaps the run count (a 4-byte DWORD indicating how many times the shortcut or executable has been opened or executed).

In the original (version 3) Windows® (scheme, the binary blocks for .exe and .lnk file values are 16 bytes long. As illustrated in the chart 1300 of FIG. 13, the byte offsets to the run count and last use time are 4 and 8, respectively. The run count starts at 5, meaning it will have a value of 6 the first time the application is run.

Notably, in the Windows 7 (version 5) scheme, the binary blocks for .exe and .lnk file values are 72 bytes long. As indicated in FIG. 13, the byte offsets to the run count and last use time are 4 and 60, respectively. The run count starts at 0.

It should be understood that the present invention specifies a method that has a number of alternative procedures to determine information that may be used to make informed decisions about the usage of software programs, that may be comprised of multiple application executable files, that are running in a network or on an individual computer. The present invention provides detailed information about the installation of particular executables and recency of use of such executables which information will facilitate better decision making regarding license purchase, allocation and memory usage throughout the network of computers or on an individual computer. The invention does not require use of run-time intervention on the computer to perform the method because it derives reliable usage measures from information that is already being collected and maintained by the operating system in various registers, keys, files and the like. The present invention has the advantage of providing usage information that is reliable and complete. As noted, this will prove valuable to software license administrators seeking to identify underused software and/or recently used software, and to determine other information such as allocation as desired in a particular application of the invention.

In accordance with a further aspect of the invention, reports can be generated across the whole network of computers regarding a particular software program, application executable file, or other information such as the number of users who have run the executable and the recency of such uses. Or individual computers in a subset of the client computers can be examined for certain executables, or versions thereof and usage of the application executable file that may be part of a software program.

While the invention has been particularly shown and described with reference to preferred embodiments thereof, it will be understood by those skilled in the art that various changes in form and details can be made without departing from the spirit and scope of the invention. Furthermore, the terms and expressions that have been employed herein are used as terms of descriptions and not of limitation. There is no intention in the use of such terms and expressions of excluding any equivalents of the features shown and described or portions thereof. It is recognized that various modifications are possible within the scope of the invention claimed.

What is claimed is:

1. A method, comprising:
   in a network of computers that are in communication with a server, collecting information, at a given client computer, about executables installed on the given computer, by;
   utilizing the collected information and generating one or more software items for each executable, wherein each software item includes an indication as to when the executable was last used and each software item includes a method of last use indicating a technique utilized to determine when the executable was last used, and wherein each software item includes one or more of the following:
   1. file name,
   2. directory,
   3. date and time the executable was last started,
   4. security identifier of the last user,
   5. whether the executable was found to be running at the time it was found, and
   6. whether the executable is registered and run as a service;
   recording the one or more software items in a list containing usage data for the executables found on the given computer;
   if only one software item is generated for a given executable, including the one software item as part of computer profile data for the given computer;
   if multiple software items are generated for the given executable, merging the multiple software items associated with the given executable as the single item and including the single item as part of the computer profile data for the given computer; and
   storing the computer profile data in an associated database; and
   producing reports about the executables, software programs comprised of the executables, or both, from the computer profile data stored in the database.

2. The method as defined in claim 1 further comprising determining the method of last use by retrieving a last access time maintained by a file system running on the given computer.

3. The method as defined in claim 1 further comprising determining the method of last use by
   opening an application's executable file by at least one of the following:
      opening a document file associated with the application's executable,
      typing the application name into a "Run" menu,
      starting the application from its Windows® Start Menu shortcut; and
   extracting usage information including at least one of a date and a time the application's executable was launched, a cumulative count of a number of times the application's executable has been launched, and a user who launched the application's executable.

4. The method as defined in claim 1 further comprising determining the method of last use by opening a Windows® Pre-fetch folder and extracting a file path of a particular executable on the given computer and a time stamp showing when the particular executable began execution.

5. The method as defined in claim 1 further comprising determining the method of last use by querying a file system for information about currently running processes.

6. The method as defined in claim 5 further comprising determining at least one of a process owner and an actual start time of the currently running processes.

7. The method as defined in claim 1 further comprising determining the method of last use by searching for applications that start running automatically when a user logs on to the given computer.

8. The method as defined in claim 1 wherein the merging process comprises comparing two software items having a same file path in accordance with one or more of the following:
   1. when a first software item associated with the given executable has a method of determining last use that is based upon a last access time, and a second software item associated with the given executable does not have such a method of determining last use, then discarding from the list the first software item associated with the given executable that has the method of determining last use that is based upon the last access time, and retaining the second software item;
   2. otherwise, if a difference between last use times of the first and second software items is greater than a predetermined threshold, then discarding either the first or second software item associated with an earlier time and retaining an other of the first or second software item;
   3. otherwise, when the difference is less than or equal to the predetermined threshold, discarding either the first or second software item that has no last user value and retaining the other of the first or second software item with a valid last user value;
   4. when the discarded software item has an IsRunning flag set, transferring that IsRunning flag to the retained software item;
   5. when the discarded software item has an IsService flag set, transferring that IsService flag to the retained software item.

9. The method as defined in claim 1 further comprising producing other reports setting forth information about one or more selected executables, or software programs that are comprised of the one or more selected executables, or both.

10. The method as defined in claim 1 wherein producing reports setting forth information about executables and/or software applications includes producing reports that include usage information for all or a subset of the computers in the network.

11. A system for managing a set of computers in a network of computers, comprising
a plurality of client computers and a server;
one or more client computers embodying program instructions for determining usage of installed executables on each client computer to create one or more software items where each software item includes an indication as to when the executable was last used and each software item includes a method of last use indicating a technique utilized to determine when the executable was last used, the client computers uploading the one or more software items associated with each respective executable to the server;
a software module embodying program instructions for performing a merge of multiple software items as a single software item if the multiple software items exist for a given executable and utilizing the single software item if only one software item exists for the given executable, and producing a list of software items that includes one item for each given executable;
the server, in communicating relationship with the client computers, embodying program instructions relating to: collecting, for each client computer, usage information associated with the installed executables on each client computer based on the one item for each given executable, and producing reports based on the computer usage information associated with the installed executables and software programs comprised of the installed executables or both that are installed on each client computer; and
a computer information database in which selected information associated with the computer usage information is stored in one or more database records.

12. The system as defined in claim 11 further comprising the server producing the reports based upon the one or more database records, wherein the reports include information about usage of one or more executables, software programs comprising the one or more executables, versions thereof, users thereof, and frequency of use of the one or more executables, the software programs or both.

13. The system as defined in claim 11 wherein the client computers are grouped based upon computer grouping criteria that are selected from information in the database, and the reports that are produced for the client computers within a given group and subgroups thereof.

14. The system as defined in claim 13 wherein said groups are based upon primary and secondary criteria.

15. The system as defined in claim 11 wherein the software module operates within a given client computer, and uploads the list to the server.

16. The system as defined in claim 11 wherein the software module operates within the server.

17. The system as defined in claim 11 further comprising a graphic user interface having a display for depiction of software versions of a particular software program that are being used in one or more of the client computers or an individual computer, and for depiction of at least one of a date of last use of the particular software program and a last user to use the particular software program.

18. The system as defined in claim 11 further comprising a graphic user interface having a display for depiction of a list of computers that are using a particular version of software.

19. The system as defined in claim 11 further comprising a graphic user interface having a display for depiction of installed software associated with a particular installed executable on a particular client computer and a date each installed software was last used by the client computer.

20. The system as defined in claim 11 further comprising a graphic user interface having a display for depiction of an install directory for a particular software program associated with a particular installed executable on a particular computer and at least one of a path name for each software item associated with the particular software program, the name of each software item, a version number, a filename and size, a date of last use and a identity of a last user.

21. The system as defined in claim 11 further comprising a graphic user interface having a display for depiction of a list of software programs associated with one or more installed executables and a version of each and an indication of a recency of use of each software program of the list.

22. The method as defined in claim 21 wherein said graphic user interface includes an information box providing further details about a software program selected by a user.

23. The method as defined in claim 11 further comprising a computer workstation for administration of the client computers which monitors usage of one or more executables, one or more software programs or both on one or more selected client computers in the network of computers, and wherein one or more particular produced reports can be visually displayed in a graphic user interface for inspection by a user.

24. A method, comprising:
collecting information, at a computer, about one or more software executable files installed on the computer;
generating one or more software items for each respective software executable file utilizing the collected information, where each software item includes an indication as to when the executable was last used and each software item includes a method of last use indicating a technique utilized to determine when the executable was last used, and wherein each software item includes one or more of the following:
1. file name;
2. directory;
3. date and time the executable was last started;
4. security identifier of the last user;
5. whether the executable was found to be running at the time it was found; and
6. whether the executable is registered and run as a service;
recording the one or more software items in a list containing usage data for the one or more software executable files on the computer;
if only one software item is generated for a given software executable file, including the one software item as part of data associated with the given software executable file;
if multiple software items are generated for the given software executable file, merging the multiple software items associated with the given software executable file to generate a single item for the given software executable file and including the single item as part of the data associated with the given software executable file; and
producing a report detailing information about the one or more software executable files.

25. A system for managing a computer, comprising:
a computer memory embodying computer program instructions for monitoring usage of installed executables on the computer, including at least one of:
collecting information, at the computer, about one or more executables installed on the computer;

generating for a given executable, one or more software items, from the collected information, wherein each software item include an indication as to when the executable was last used and each software item includes a method of last use indicating a technique utilized to determine when the executable was last used and wherein each software item includes one or more of the following:

file name;

directory;

date and time the given executable was last started;

security identifier of the last user;

whether the given executable was found to be running at the time it was found; and whether the given executable is registered and run as a service; and a computer workstation for administration of the system which monitors the one or more installed executables, to determine usage of the one or more installed executables, software programs comprised of the one or more installed executables, or both, and producing reports relating to the generated software items associated with usage of the one or more installed executables.

26. The system for managing a computer as defined in claim 25 wherein the reports are visually displayed in a graphic user interface for inspection by a user.

27. A database management system, comprising:

a network of client computers and a server;

one or more client computers embodying program instructions for determining usage of executables on the one or more of the client computers, creating unique software items for each executable wherein each software item includes an indication as to when the executable was last used and each software item includes a method of last use indicating a technique utilized to determine when the executable was last used, and including the software items in computer profile data associated with each client computer; and a server in communicating relationship with the one or more client computers, the server embodying program instructions for collecting the computer profile data associated with each respective client computer in a computer information database and producing records relating to information contained in the software items, and producing reports regarding usage of the one or more executables installed on the one or more of the client computers based on the computer profile data associated with each respective client computer.

28. A method, comprising:

collecting data about usage of executables from a number of sources within a memory of one or more computers;

generating a software item for each executable, wherein each software item includes an indication as to when the executable was last used and each software item includes a method of last use indicating a technique utilized to determine when the executable was last used;

sorting the software items into a list;

merging the list including, applying multiple queries to the software items on the list that refer to the same file path to determine whether a duplicate software item is found for a given executable, and when a duplication is found, transferring desired data from the duplicate software item to a retained item and discarding the duplicate software item;

combining the data to produce a list of retained software items that include usage information about each respective executable that is installed on that computer; and storing the usage information contained in the retained software items as one or more records in an associated database.

29. The method as defined in claim 28 further comprising at an associated server, generating one or more reports from the one or more records relating to the one or more of the computers as requested by an administrator.

30. The method as defined in claim 1 wherein the method of last use is assigned a value signifying that the indication as to when the executable was last used is not useful.

* * * * *